US008781971B2

(12) United States Patent
Garst, Jr. et al.

(10) Patent No.: US 8,781,971 B2
(45) Date of Patent: Jul. 15, 2014

(54) METHOD AND APPARATUS FOR ENFORCING SOFTWARE LICENSES

(71) Applicant: Apple Inc., Cupertino, CA (US)

(72) Inventors: Gerald Blaine Garst, Jr., Belmont, CA (US); Bertrand Serlet, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/784,712

(22) Filed: Mar. 4, 2013

(65) Prior Publication Data
US 2013/0179989 A1 Jul. 11, 2013

Related U.S. Application Data

(63) Continuation of application No. 13/244,233, filed on Sep. 23, 2011, now Pat. No. 8,452,712, which is a continuation of application No. 09/704,254, filed on Nov. 1, 2000, now Pat. No. 8,027,925, which is a continuation of application No. 08/901,776, filed on Jul. 28, 1997, now Pat. No. 6,188,995.

(51) Int. Cl.
*G06F 21/00* (2013.01)
*G06Q 20/12* (2012.01)

(52) U.S. Cl.
CPC ............................ *G06Q 20/1235* (2013.01)
USPC .................................................. 705/59

(58) Field of Classification Search
CPC .................................................. G06Q 2220/18
USPC .................................................. 705/59
See application file for complete search history.

(56) References Cited

U.S. PATENT DOCUMENTS

| | | | | |
|---|---|---|---|---|
| 5,109,413 A | * | 4/1992 | Comerford et al. | 705/54 |
| 5,343,527 A | | 8/1994 | Moore | |
| 5,412,717 A | * | 5/1995 | Fischer | 713/156 |
| 5,481,706 A | * | 1/1996 | Peek | 710/200 |
| 5,568,552 A | * | 10/1996 | Davis | 705/59 |
| 5,745,879 A | | 4/1998 | Wyman | |
| 5,757,914 A | | 5/1998 | McManis | |
| 5,922,073 A | * | 7/1999 | Shimada | 726/6 |
| 8,027,925 B1 | | 9/2011 | Garst et al. | |

FOREIGN PATENT DOCUMENTS

| | | |
|---|---|---|
| EP | 0 570 123 A1 | 11/1993 |
| EP | 0 735 488 A1 | 3/1995 |
| EP | 0 667 572 A1 | 8/1995 |

* cited by examiner

*Primary Examiner* — Charles C Agwumezie
(74) *Attorney, Agent, or Firm* — Womble Carlyle Sandridge & Rice LLP

(57) ABSTRACT

A method and apparatus for enforcing software licenses for resource libraries such as an application program interface (API), a toolkit, a framework, a runtime library, a dynamic link library (DLL), an applet (e.g., a Java or ActiveX applet), or any other reusable resource. The resource library can be used by authorized end user software programs. A "per-program" licensing scheme for a resource library can allow a resource library to be licensed only for use with particular software programs.

20 Claims, 12 Drawing Sheets

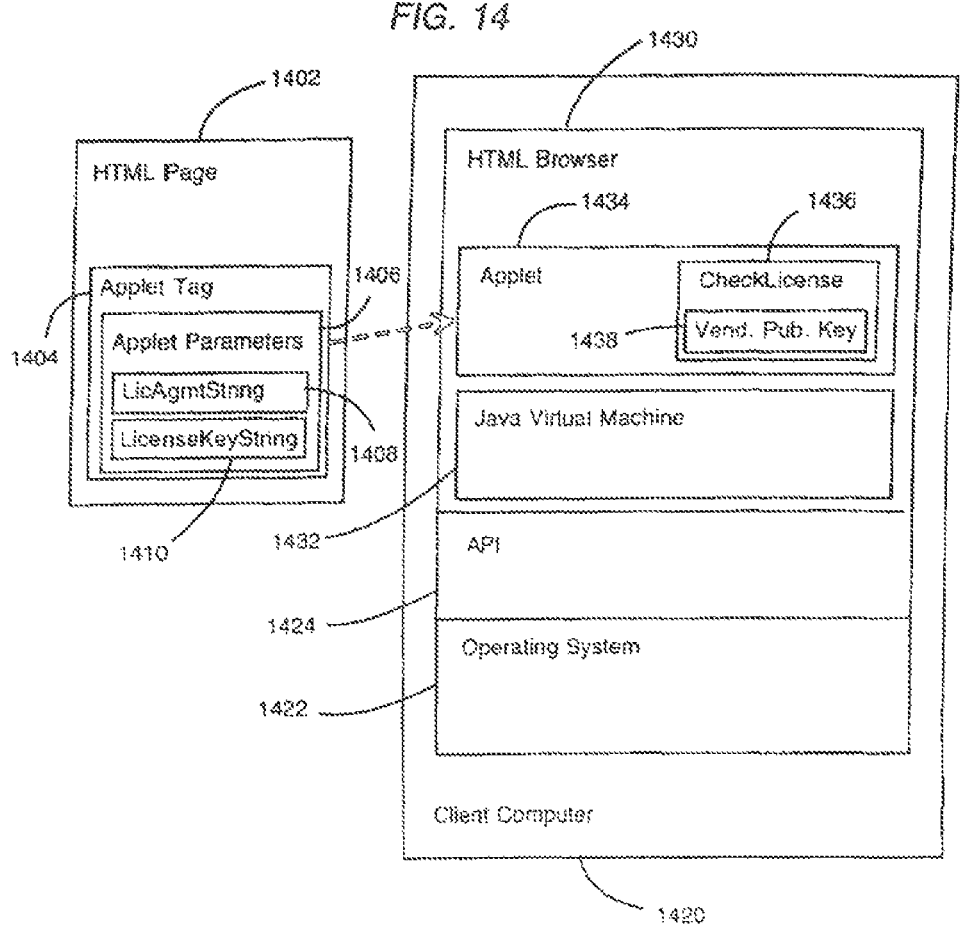

METHOD AND APPARATUS FOR ENFORCING SOFTWARE LICENSES

This application is a continuation of U.S. application Ser. No. 13/244,233, filed Sep. 23, 2011, which is a continuation of U.S. application Ser. No. 09/704,254, filed Nov. 1, 2000, now U.S. Pat. No. 8,027,925 dated Sep. 27, 2011, which is a continuation of U.S. application Ser. No. 08/901,776, filed Jul. 28, 1997, now U.S. Pat. No. 6,188,995 dated Feb. 13, 2001. The entire content of each of the foregoing applications are hereby incorporated by reference.

BACKGROUND OF THE INVENTION

1. Field of the Described Embodiments

The present invention relates generally to the distribution of computer software, and more particularly to a method and apparatus for automated enforcement of computer software licenses.

2. Background Art

Some computer software programs use so-called "resource libraries" to provide part of their functionality. There is usually a license fee required to use a resource library. Under current schemes, it is not always possible to charge the license fee to all users of a resource library. This problem can be understood by comparing software structures that, use resource libraries with basic software structures that do not.

Basic Software Structure

FIG. 1 illustrates a basic software structure. In the example of FIG. 1, the software comprises two layers. These layers are the operating system 110, and the application program 120. Operating system 110 is responsible for controlling the allocation and usage of hardware resources such as memory, central processing unit (CPU) time, disk space, and peripheral devices. Operating system 110 provides a variety of specific functions that can be utilized by a variety of software programs such as application program 120. Application program 120 provides specific end user functions, such as word processing, database management, and others. Application program 120 communicates with the computer hardware via functions provided by operating system 110. Operating system 110 provides an interface between hardware 100 and application program 120.

FIG. 2 illustrates a second software structure. The software structure of FIG. 2 contains an additional layer of software, resource library 215, interposed between application program 220 and operating system 110. Resource library 215 provides a pre-packaged set of resources or routines that can be accessed by software programs such as application program 220 during execution. These resources provide higher level functions than those provided by operating system 210. For example, these resources may provide routines for managing a graphical user interface, for communicating with other computers via a network, or for passing messages between program objects. Typically, resource library 215 provides one or more resources or functions that can be used by many different software programs. By using the pre-packaged resources provided by resource library 215, a software program such an application program 220 can be made smaller and program development time can be shortened because the program itself need not include code to provide the functions provided by resource library 215.

Resource Libraries

In addition to application programs, resource libraries are used by other types of software programs, including device drivers, utility programs and other resource libraries.

Resource library 215 constitutes any set of one or more resources that exists separately from an application program or other software program and that can be used by more than one software program. For example, resource library 215 may comprise an application program interface (API) a toolkit, a framework, a resource library, a dynamic link library (DLL), an applet, or any other reusable resource, including an application program that can be accessed by another program (e.g. by using object linking and embedding (OLE)). Examples of resource libraries include Windows DLL's (DLL's used with the Microsoft Windows™ operating environment), the Apple Macintosh™ toolkit, the OpenStep API from NeXT Software. Inc., OLE enabled application programs such as Microsoft Word™, Java packages, and ActiveX applets.

A software program typically utilizes a resource provided by a resource library by sending an appropriate message to the resource library and supplying the parameters required for the resource to be executed. Assuming the appropriate parameters have been supplied, the resource executes, and an appropriate response message is returned to the requesting program.

A software program may use resources provided by several different resource libraries, a resource library may be used by several different programs, and a resource library may itself use other resource libraries. FIG. 3 illustrates a computer system that includes several programs and several resource libraries. In the example of FIG. 3, there are two application programs 300 and 310, and three resource libraries 320, 330, and 340.

Application program 300 uses resources provided by operating system 110 and by resource libraries 320 and 330. Application program 310 uses resources provided by operating system 110 and by resource libraries 330 and 340. The resources of resource library 330 are thus shared by application programs 300 and 310.

License Fee

Generally, computer software is licensed to an end user for a fee. The end user pays a single purchase price or license fee in exchange for the right to use the end user program on a computer system. Resource libraries are often packaged or "bundled" with an end user program by the maker of the program such that the end user receives a copy of resource libraries required by a program when the end user buys a copy of the program. The price of the resource library is built into the end user program price. The end user program developer, in turn, pays a royalty to the resource library vendor for the right to bundle and resell the resource library.

Since a resource library can be used with multiple end user programs, once the end user receives a copy of the resource library, the end user can use the resource library with any other program that is compatible with the resource library. In this case, the resource library vendor receives no additional revenue when the vendor's resource library is used with additional programs. Accordingly, it would be desirable for a resource library vendor to be able to ensure that an end user can use the resource library only with programs for which a license fee has been paid to the vendor for use of the resource library. Thus there is a need for a software mechanism for enforcing software license agreements that automatically ensures that a resource library can only be used by programs that have been licensed for use with the resource library by the resource library vendor.

SUMMARY OF THE DESCRIBED EMBODIMENTS

The present invention comprises a method and apparatus for enforcing software licenses for resource libraries. The term "resource library" as used herein refers to any reusable software resource that is usable by more than one program or other resource library. The term "resource library" includes, but is not limited to, an application program interface (API), a toolkit, a framework, a runtime library, a dynamic link library (DLL), an applet (e.g. a Java or ActiveX applet), an application program whose functionality can be accessed by other programs (e.g. using OLE) or any other reusable resource. The present invention allows the resource library to be selectively used only by authorized end user software programs. The present invention can be used to enforce a "per-program" licensing scheme for a resource library whereby the resource library is licensed only for use with particular software programs, as well as site licenses and other licensing schemes.

In one embodiment, an access authorization indicator such as a license text string and a corresponding license key are embedded in a program that has been licensed to use a resource library. The license text string and the license key are supplied, for example, by a resource library vendor to a program developer who wants to use the resource library with an end user program being developed.

The license text string includes information about the terms of the license under which the end user program is allowed to use the resource library. In one embodiment, the license key is an algorithmic derivation, such as, for example, a digital signature, of the license text string that is used to authenticate the license text string. The resource library in turn is provided with a checking routine that includes means for reading the license text string and the license key, and for determining, using the license key, whether the license text string is authentic and whether the license text string has been altered. Resource library functions are made available only to a program having an authentic and unaltered license text string.

In one embodiment, the license key constitutes the resource library vendor's digital signature of the license text string. The resource library has a checking routing for verifying the resource library vendor's digital signature. The resource library is unlocked and made available for use with the requesting program only if the license text string is verified as authentic by the resource library. For a given program, only the resource library proprietor can produce a license key for a particular license agreement that will unlock the resource library for that program and that program only. Any modification of the license key or the license agreement text string in the requesting software program is detected by the checking routine, causing the resource library to remain locked. The license text string may also specify an expiration dale for the license, in which case the resource library is unlocked only if the expiration date has not yet occurred.

In one embodiment, a per-site enforcement method is provided, in which any software program present at a given user site works with the resource library once the resource library is provided with the proper per-site license key.

BRIEF DESCRIPTION OF THE DRAWINGS

FIG. 14 illustrates an embodiment of the invention in which the resource library is an applet.

DETAILED DESCRIPTION OF SELECTED EMBODIMENTS

A method and apparatus for enforcing software licenses is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Computer System

Figure 4:
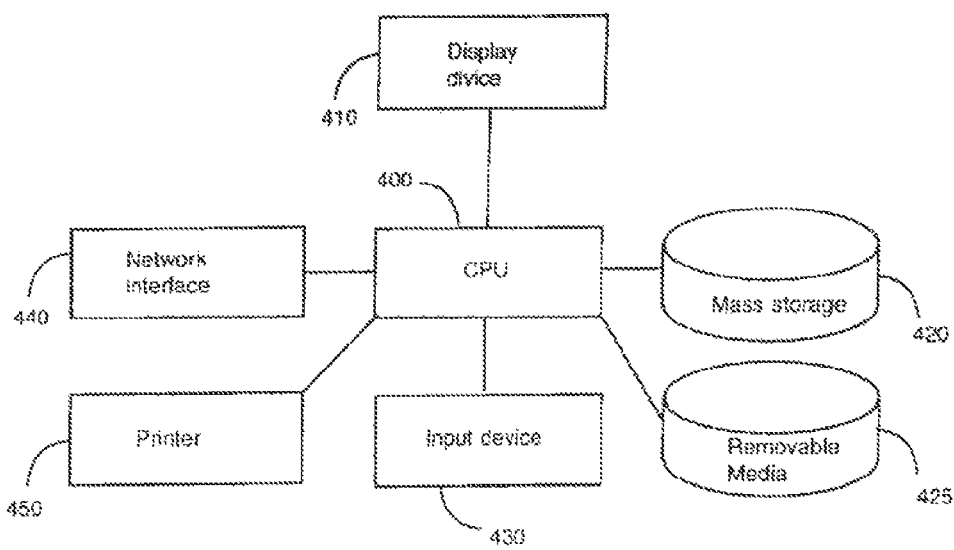
FIG. 4 illustrates an embodiment of a computer system that can be used with the present invention.

The present invention can be implemented on any of a variety of computer systems, including, without limitation, network computers, special purpose computers, and general purpose computers such as the general purpose computer illustrated in FIG. 4. The computer system shown in FIG. 4 includes a CPU unit 400 that includes a central processor, main memory, peripheral interfaces, input-output devices, power supply, and associated circuitry and devices; a display device 410 which may be a cathode ray tube display, LCD display, gas-plasma display, or any other computer display; an input device 430, which may include a keyboard, mouse, digitizer, or other input device; non-volatile storage 420, which may include magnetic, re-writable optical, or other mass storage devices; a transportable media drive 425, which may include magnetic, re-writable optical, or other removable, transportable media, and a printer 450. The computer system may also include a network interface 440, which may include a modem, allowing the computer system to communicate with other systems over a communications network such as the Internet. Any of a variety of other configurations of computer systems may also be used. In one embodiment, the computer system comprises an Intel Pentium™ CPU and runs the Microsoft Windows 95™ operating environment. In another embodiment, the computer system comprises a Motorola 680×0 series CPU and runs the NeXTStep operating system.

When a computer system executes the processes and process flows described herein, it is a means for enforcing software licenses.

The invention can be implemented in computer program code in any desired computer programming language.

Licensing Module

Figure 1:
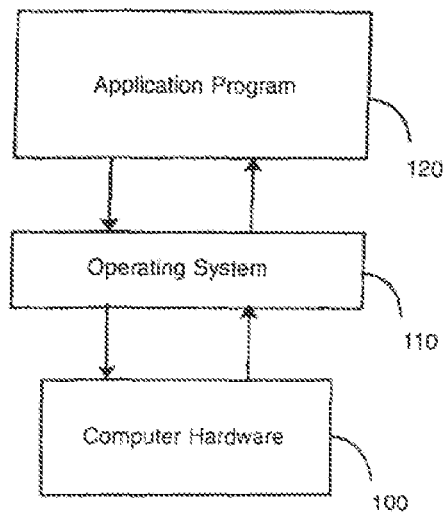
FIG. 1 illustrates an example of a software structure.
Figure 2:
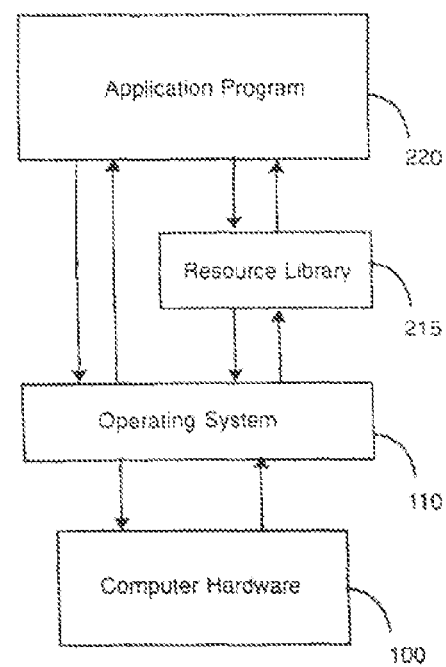
FIG. 2 illustrates an example of a software structure including a resource library.
Figure 3:
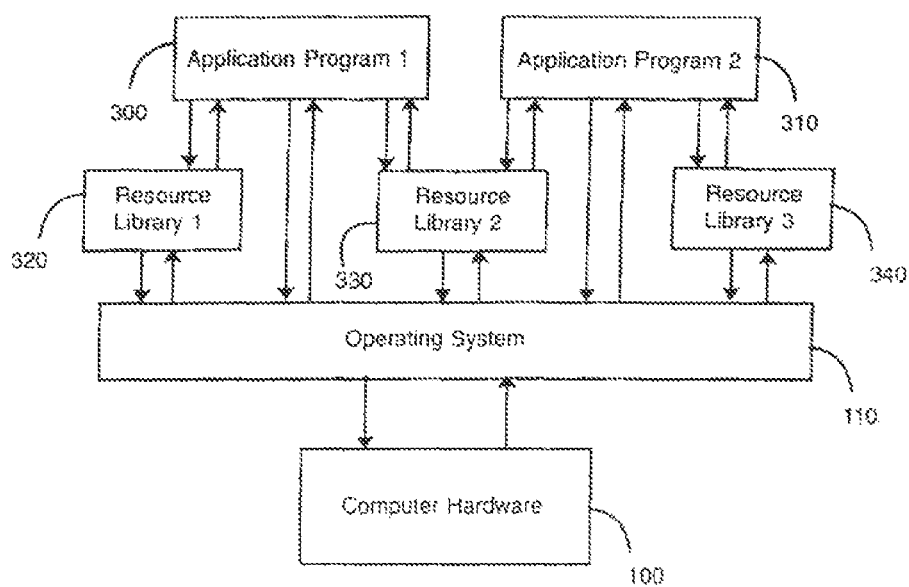
FIG. 3 illustrates an example of a software structure including several application programs and resource libraries.
Figure 5:
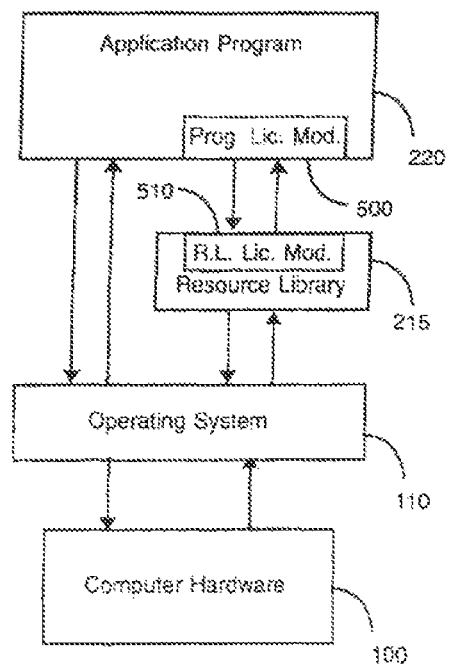
FIG. 5 illustrates a software structure of one embodiment of the present invention.

FIG. 5 is a block diagram illustrating software components of one embodiment of the present invention. As shown in FIG. 5, this embodiment, like the prior art embodiment of FIG. 2, includes computer hardware 100, operating system 110, application program 220 and resource library 215. However, the present invention adds two additional components: Program licensing module 500 and resource library licensing module 510. These modules are shown in greater detail in FIG. 6.

Figure 6:
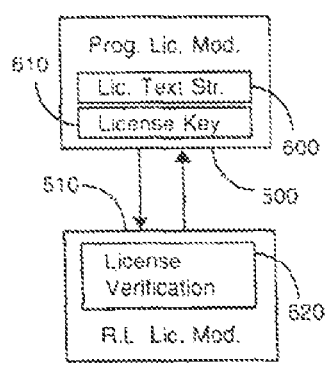
FIG. 6 illustrates a software structure of one embodiment of the present invention.

FIG. 6 illustrates program licensing module 500 and resource library licensing module 510 in one embodiment of the present invention. As shown in FIG. 6, program licensing module 500 contains license text string 600 and license key 610. License text string 600 contains data specifying terms of the software license agreement under which the resource library vendor has licensed the program containing program licensing module 510 to use the vendor's resource library. For example, license text string 600 may include the following text:

TABLE 1

Example Licence Text String

"(c) Copyright 1997. Resource Library Vendor, Inc. Program A is licensed to use Resource Library D. No expiration date. This license may not be legally copied or transferred to another program."

In the example shown in Table 1, license text string 600 specifies the name of the resource library vendor ("Resource Library Vendor, Inc."), the name of the program licensed to use the resource library ("Program A"), and the name of the resource library that has been licensed ("Resource Library D"). License text string 600 also indicates that the license has "No expiration date."

License key 610 is algorithmically derived from license text string 600. In one embodiment, license key 610 comprises a digital signature of the resource library vendor.

A digital signature is a mechanism that has been developed to help ensure the integrity of electronic messages. A digital signature is used to authenticate an electronic message and to determine whether an electronic message has been altered.

One form of digital signature uses a message digest. A message digest is a value that is generated when an electronic message is passed through a one way encryption process ("digesting process") such as a hashing routine. An ideal digesting process is one for which the probability that two different electronic messages will generate the same message digest is near zero. In this form of digital signature, both the originator and the recipient need to know which digesting process is being used. The originator generates the electronic message, and generates a message digest by passing the electronic message through the digesting process. The originator digitally signs the resulting message digest, for example by performing an algorithmic operation on the message digest using the originator's private key. Alternatively, instead of generating a message digest and signing the message digest, a sender may sign the message itself.

To verify the authenticity of a digitally signed message, the recipient obtains the electronic message and the digital signature of the sender. The recipient verifies the digital signature using an appropriate verification process. For example, in one embodiment, the recipient verifies the digital signature by performing an algorithmic process on the digital signature using the sender's public key. The verification process verifies that the electronic message was (1) digitally signed by the sender, and (2) that the electronic message content was not changed from the time that it was signed to the time that the digital signature as verified.

In the present embodiment of the invention, the "message" that is digitally signed is license text string 600. The signer is the resource library vendor. The result is license key 610.

License text string 600 and license key 610 are used by resource library licensing module 510 to verify that a requesting program has been licensed to use the resource library. As shown in FIG. 6, resource library licensing module 510 includes a license verification module 620. When a program requests access to the resource library, resource library licensing module 510 reads license text string 600 and license key 610 from the requesting program. In one embodiment, license text string 600 and license key 610 are sent to the resource library by the requesting program along with a request for access to the resource library. In another embodiment, resource library licensing module 510 reads license text string 600 and license key 610 from a constant definition section of the requesting program.

Resource library licensing module 510 uses license key 610 to verify the content of license text string 600 in the same manner as a digital signature is used to verify an electronic message. Using license verification module 620, resource library licensing module 510 verifies that license text string 600 is authentic (i.e. was generated by the resource library vendor) and unaltered. If the verification process is unsuccessful, indicating that the digital signature is not good, resource library licensing module 510 refuses the requesting program's request for access to the resource library. If the verification process is successful, resource library licensing module 510 inspects the license to determine any license limitations included in license text string 600.

The example license text string 600 shown in Table 1 above identifies "Program A" as the program that is licensed to use the resource library, and states that the license has "No expiration date." Resource library licensing module 510 obtains the name of "Program A" from license text string 600, and checks whether the requesting program is Program A. If the requesting program is a program other than Program A, access to the resource library is denied.

Rather than specifying "No expiration date" as in the present example, license text string 600 may specify an expiration date and/or a beginning date for the license. If any such dates are specified in license text string 600, resource library licensing module 510 checks to make sure that the current date falls within the period of validity of the license prior to granting access to the resource library. If the current date is not within the license's period of validity, the requesting program is denied access to the resource library.

Access Procedure

Figure 7:
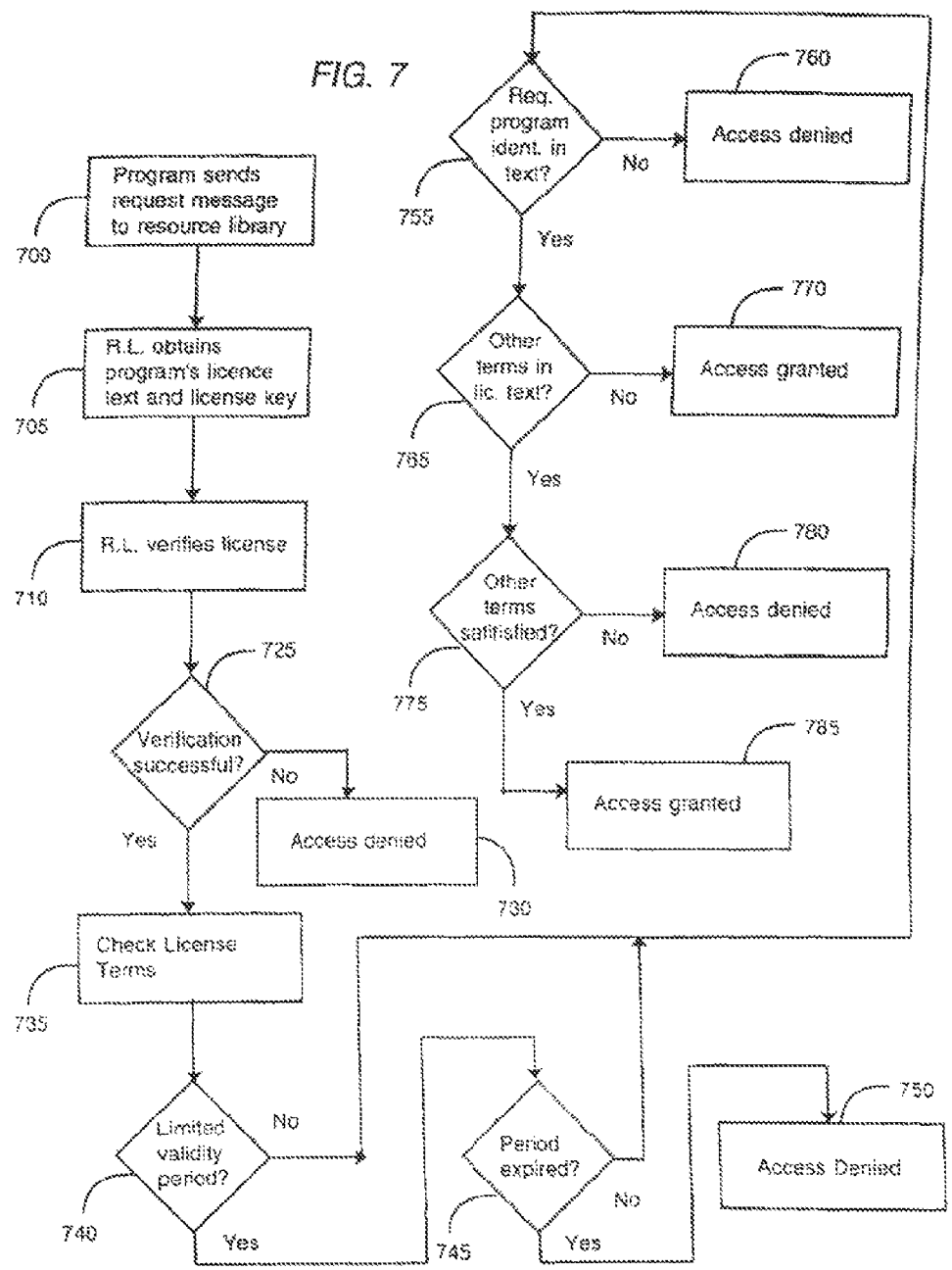
FIG. 7 is a flow chart illustrating the operation of one embodiment of the present invention.

The process used by a resource library to grant or deny access to a requesting program in one embodiment of the invention is illustrated in FIG. 7. In one embodiment, this process occurs the first time a program requests access to a resource library. In another embodiment, this process occurs each time the resource library receives a request for access.

As shown in FIG. 7, the process begins with a requesting program 15 making a request to use the resource library at step 700. At step 705, the resource library obtains the requesting program's license text and license key. The license text and license key may, for example, be included in the request, or the resource library may read the license text and license key from a constant declaration area of the requesting program, or the resource library may obtain the license text and license key by some other means.

After obtaining the license text and license key, the resource library verifies the authenticity of the license text, using the license key, at step 710. At step 725, the resource library determines whether the verification is successful. If the authenticity of the license text is not verified, access to the resource library is denied at step 730.

if the verification of the authenticity of the license text is successful, the resource library checks the license terms included in the license text at step 735. At step 740, the resource library determines whether a limited validity period is specified in the license text. If no validity period is specified, the process continues on to step 755. If a validity period is specified, the resource library checks whether the validity period has expired at step 745. The validity period will have expired either if the current date is before a beginning date specified in the license text or if the current late is after an expiration date specified in the license text. If the validity period has expired, access to the resource library is denied at step 750.

If the validity period has not expired, processing continues to step 755. At step 755, the resource library determines whether the requesting program is the same program as the program specified in the license text. If the requesting program is not the program specified in the license text, access to the resource library is denied at step 760. If the requesting program is the program specified in the license text, the resource library checks whether there are any other license terms contained in the license text at step 765. If there are no other license terms, access to the resource library is granted at step 770. If there are other license terms, the resource library checks whether those terms are satisfied at step 775. If the terms are not satisfied, access to the resource library is denied at step 780. If the terms are satisfied, access to the resource library is granted at step 785.

The invention may be implemented in the Objective-C language, Objective-C is essentially the ANSI C language with object messaging extensions. A full description of the Objective-C language appears in "Object-Oriented Programming and the Objective-C Language," published by Addison-Wesley (ISBN 0-201-63251-9) (1993), and incorporated by reference herein. However, the invention can also be implemented in any other suitable computer programming language.

As described below, the invention can be implemented by embedding appropriate segments of program code in the source code of a program that uses a resource library and in the source code of the resource library itself. The resource library is compiled to produce an executable implementation which can be linked to a compiled and executable version of the program.

Application Program Interface (API)

In one embodiment of the invention, the resource library is an application program interface ("API"). An API has three major functions: it receives requests from an application program to carry out fundamental operations such as receiving user input or displaying output; it converts each request into a form understandable by the particular operating system then in use; and it receives responses and results from the operating system, formats them in a uniform way, and returns them to the application program.

APIs generally are prepared in an executable implementation which is compiled specifically for the underlying operating system. This is necessary because different operating systems provide different calling mechanisms and communications methods for such primitive operations as reading and writing a mass storage device. For example, an API may provide a "draw(x,y)" function that can be called by an application program to draw a point at coordinates (x,y) on the display device of a computer system. Upon receipt of a draw (x,y) request from an application program, the API converts the request into a command or function call specific to the operating system then in use. For example, the API might convert the draw(x,y) request into a series of machine instructions to load registers with the x,y values and call an operating system function or generate an interrupt. The person writing the application program need not worry about such details.

In some cases the API refers to or calls functions located in an external function library such as a set of device drivers rather than directly calling the operating system, Device drivers are small executable programs that enable the operating system to address and work with particular hardware devices such as video adapters and printers, Device drivers also constitute a form of resource library.

Depending on the operating system, the API can be prepared in any of several executable formats such as a runtime library, device linked library (DEL), or other executable file. The API is provided to the end user in one of these object code versions, or "implementations," of the API. In industry usage the term API can refer to a definition or specification of functions in the API, to the source code of the API that implements such functions, or to the executable version of such source code which is ultimately distributed to and used by end users. Examples of APIs are the OpenStep API, available from NeXT Software. Inc., Redwood City, Calif., and the Visual Basic DLL, available from Microsoft Corporation, Redmond, Wash.

The term API as used herein also includes the Java programming language. Rather than being distributed in executable form, Java programs are distributed as packages of "bytecodes," The bytecodes are compiled at runtime into executable code by a Java Virtual Machine (JVM) resident on the computer on which the Java program is run. Different JVM's are used for different computer processors and operating systems. However, all JVM's read the same bytecode. Accordingly, Java bytecode programs and packages are platform independent. Java bytecode programs and packages need only be written in one form. The JVM's take care of adapting the bytecode to different computer platforms. Packages of Java bytecode can be used by different Java programs, and, as such, constitute resource libraries.

Generally the end user can buy the executable version of the API implementation separately from any particular application program from its creator or vendor, or the end user may buy the API implementation bundled with an application program that requires and uses the API to run.

In either case, the API implementation is installed in executable form in the end user's computer system (typically by copying it to a mass storage device such as a hard disk). After the API implementation is installed, the end user can launch (begin running) an application program which uses the API implementation. The application program locates the API implementation on the hard disk and references, calls, or is linked to the API implementation. In operation, when the application program needs to carry out an operation implemented in the API implementation, such as drawing a line on the screen, the application program calls the appropriate function in the API implementation. The appropriate function in turn tells the operating system (or the device independent windowing extensions, or another device driver how to execute the desired operation.

A significant advantage of the use of APIs is that an application program, such as a word processor, can be written to communicate only with the API, and not with the operating system. Such an application program can be moved or ported to a different operating system without modifying the program source code. Because of this, application programs written for APIs are said to be operating system independent, meaning that the application program source code can be moved without modification to another computer system having a different operating system, and recompiled and linked with an API implementation prepared for that operating system. The ability to move unmodified application source code to different operating systems is a key advantage of using APIs.

However, from the point of view of API vendors, APIs also have the significant disadvantage that an end user needs only one copy of the API to run multiple application programs which are compatible with the API. Since the API provides generic input, output, and processing functions, it will work with a variety of different end user application programs. Some software vendors desire to restrict use of their API implementations to one application, or to require the end user to purchase a key to the API for each application acquired by the end user, so that the end user pays a different or larger fee to use additional application programs.

The present invention provides away to arrange a resource library such as an API to work only with particular authorized application or other end user programs.

API License Embodiment

Figure 9:
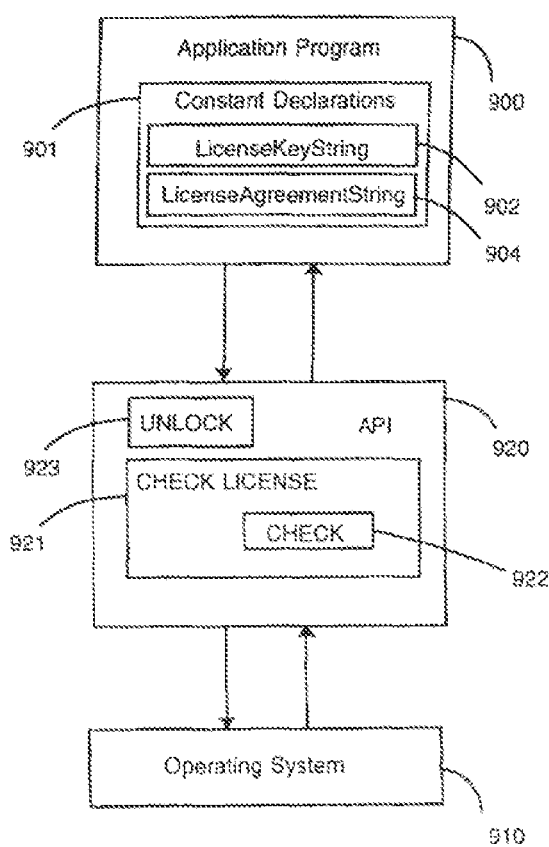
FIG. 9 illustrates a software structure of one embodiment of the present invention.

As is well known in the art, the source code of a computer program can be divided into several components including a variables declaration area, a constant declaration area, and a procedure definition area. FIG. 9 illustrates an embodiment of the present invention that is used with an API. As shown in FIG. 9, in this embodiment, an application program 900 is provided with a LicenseKeyString constant 902 and a LicenseAgreementString constant 904 in the constant declarations area 901 of the application program's source code. In the embodiment of FIG. 9, LicenseKeyString 902 and LicenseAgreementString 904 are declared as global string constants.

In one embodiment, LicenseAgreementString 904 contains a text string, prepared by the vendor of the API, that describes in human readable text the license restrictions concerning use of the API applicable to the application program. For example, the LicenseAgreementString may read, "This API is licensed for individual internal use only for concurrent use only with Word Processor application program." The specific text of the LicenseAgreementString is prepared by the licensor of the API. The text can be any arbitrary combination of words, symbols, or numbers.

The LicenseKeyString 904 contains a key corresponding to and based upon the LicenseAgreementString 902. For example, the LicenseKeyString can be a digital signature of the LicenseAgreementString prepared by providing the LicenseAgreementString and a private key of the API vendor to a digital signature process. The precise method of generating the LicenseKeyString is not critical, provided that only the licensor of the API can generate a unique LicenseKeyString corresponding to the LicenseAgreementString. The values of the two strings are created by the vendor of the API and are provided to the person or company that is developing the end user application program (for example, the API vendor can send the two string values to the application program developer by e-mail). The application program developer is instructed by the API vendor to place the string declarations in the source code of the developer's end user application program. The two values may be public, so the API vendor or developer need not keep the values secret or hidden from users of the end user application program. The two strings are compiled into the executable form (or, in the case of Java, the bytecode packages) of the application program. This binds the LicenseKeyString and LicenseAgreementString into the executable code (or bytecode) of the application program.

As further shown in FIG. 9, API 920 is provided with an UNLOCK function 923 and a CHECK LICENSE function 921 for testing whether the LicenseKeyString matches the LicenseAgreementString. In the embodiment of FIG. 9, the CHECK LICENSE function 921 includes sub-function CHECK 922.

API Procedure

Figure 10:
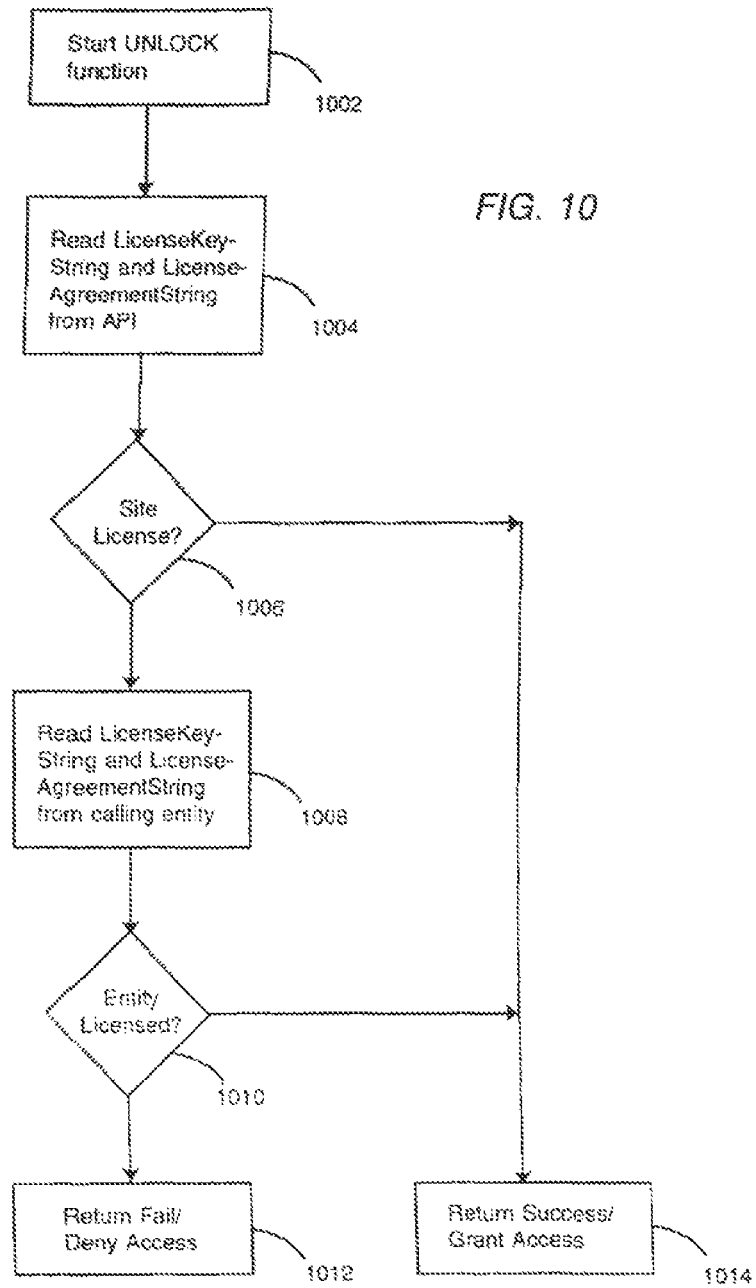
FIG. 10 is a flow start illustrating the operation of one embodiment of the present invention.

FIG. 10 is a flow diagram of processing steps of the UNLOCK function 923. The process of FIG. 10 may, for example, be carried out at runtime, when both the application program and the API are compiled, linked, and running.

The UNLOCK function is called by the API upon initialization of the API, for example, upon being called by application program 900 or by some other calling function, object, or program (the "calling entity"). Processing begins at step 1002. The UNLOCK function first checks to see whether the API has been provided with a site license that allows the API to be used with any calling entity on the computer in which the API has been installed. In this embodiment, a site license is indicated by adding an appropriate LicenseKeyString and LicenseAgreementString to the API when the API is installed. This process is described in greater detail below. An appropriate LicenseAgreementString may, for example, be "API site license granted. This API may be used with any application program at the site at which it is installed." The corresponding appropriate LicenseKeyString may, for example, be derived by applying the API vendor's private key and a digital signature process to the LicenseAgreementString.

The process of checking for a site license begins at step 1004 where the UNLOCK function locates and extracts (to the extent they have been provided to the API) a LicenseKeyString and a LicenseAgreementString from within the API. Control is then passed to step 1006 where the function tests whether the API is licensed under a site license for unrestricted use with any application program. The test of step 1006 is accomplished by verifying the authenticity of the LicenseKeyString and LicenseAgreementString extracted from the API, and, if authentic, determining whether the LicenseAgreementString indicates that a site license has been granted.

The authenticity of the LicenseAgreementString and LicenseKeyString is determined by passing the LicenseAgreementString, the LicenseKeyString, and a copy of the API vendor's public key stored in the API implementation to the CHECK process 922. CHECK process 922 uses a digital signature authentication ("DSA") process to verify the authenticity of the LicenseAgreementString.

The DSA process used by CHECK process 922 can be any digital signature authentication process capable of reading an input string and a key purportedly representing the digital signature of the input string, applying an appropriate authentication process, and determining the validity of the input string by testing whether the key constitutes the signatory's digital signature of the input string. An exemplary DSA process is disclosed, for example, in U.S. patent application Ser. No. 08/484,264, "Method and Apparatus for Digital Signature Authentication," assigned to the assignee hereof. The DSA technology of RSA Data Security, Inc. also can be adapted for use with the invention. A per-session cache can be used to improve execution speed of the CHECK process.

If the LicenseKeyString is determined to be the API vendor's valid digital signature of the LicenseAgreementString, the LicenseAgreementString is inspected to determine whether it indicates that a site license has been granted. If the LicenseAgreementString does so indicate, the test of step 1006 succeeds and control is passed to step 1014. At this point the UNLOCK function returns a positive result to the calling entity, and allows the calling entity to use the API.

If the test of step 1006 fails, control is passed to step 1008 where the UNLOCK function extracts and reads the LicenseKeyString and LicenseAgreementString from a data segment (for example, the compiled constant declarations area) of the calling entity. Alternatively, the calling entity may transmit the LicenseKeyString and the LicenseAgreementString to the API. Having obtained the calling entity's LicenseKeyString and LicenseAgreementString, control is passed to step 1010 where the function tests whether the calling entity is licensed to use the API. This test comprises two parts. One part, using CHECK process 922 as described above, determines whether the LicenseAgreementString is a LicenseAgreementString validly issued by the API vendor. A second part examines the LicenseAgreementString for the terms of the included license, and determines whether those terms are met. If the result is positive then control is passed to step 1014. At this point, use of the API with the calling entity is authorized and the API returns control to the calling entity so that the calling entity resumes normal execution.

If the result is negative then the calling entity is not licensed to use the API, and control is passed to step 1012. At step 1012 the API generates an error message such as "API Not Licensed For Use With This Application program," and declines access to the calling entity.

Figure 11:
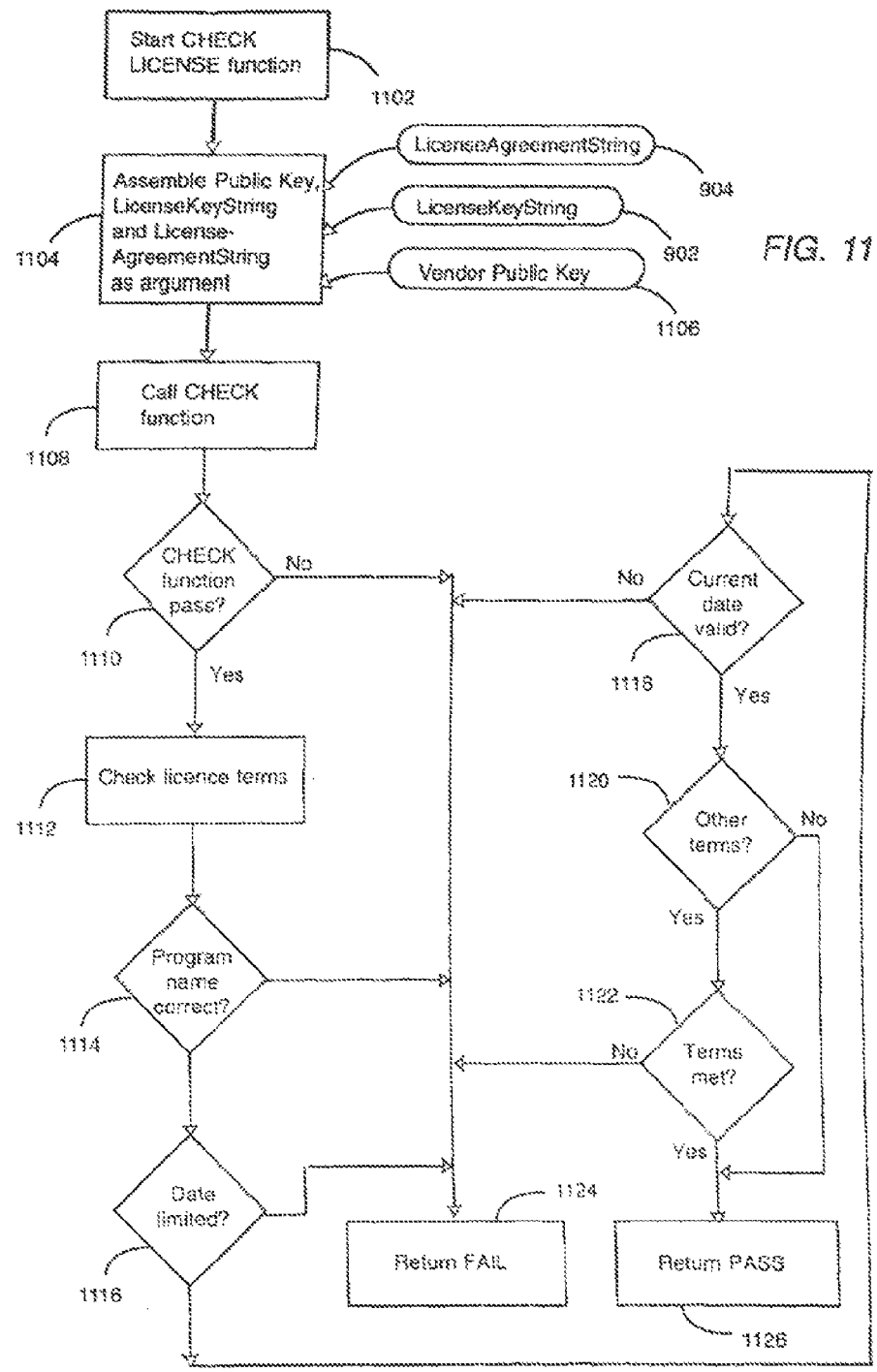
FIG. 11 is a flow start illustrating the operation of one embodiment of the present invention.

Steps 1006 and 1010 carry out the license tests by calling the CHECK LICENSE function 921 shown in FIG. 9 and FIG. 11. Processing steps of the CHECK LICENSE function 921 are illustrated in FIG. 11.

The process flow of the CHECK LICENSE function starts at step 1102. Control is passed to step 1104 where the CHECK LICENSE function assembles the LicenseKeyString 902, LicenseAgreementString 904, and a copy of the API vendor's public key 1106 as function call arguments, in preparation for calling the CHECK function 922. As discussed more fully below, the public key 1106 is prepared by the API vendor based upon a secret private key. The three arguments are passed to the CHECK function at step 1108.

If the CHECK function (described in greater detail below) returns a FAIL or false state, control is passed to step 1124 and the CHECK LICENSE function itself returns a fail state. If the CHECK function returns a PASS or true state, control is passed to step 1112 where the CHECK LICENSE function checks the terms of the license specified in the LicenseAgreementString. At step 1114, the CHECK LICENSE function checks whether the name of the calling entity is the same as the name of the licensed entity specified in the LicenseAgreementString. If the name of the calling entity is incorrect, control passes to step 1124, where a fail message is passed to the UNLOCK function.

If the name of the calling entity is correct, the CHECK LICENSE function tests whether the LicenseAgreementString contains an expiration date at step 1116. An expiration date can be placed in the LicenseAgreementString by the API vendor to establish a termination date after which use of the API by the calling entity is no longer allowed, CHECK LICENSE may, for example, test for an expiration date by searching for a text string that indicates an expiration date, such as, for example, "expiration date" or "valid until."

If the test of step 1116 is positive, control is passed to step 1118 where the CHECK LICENSE function tests whether the current date, as maintained, for example by a computer clock or operating system, is greater than the expiration date found in the LicenseAgreementString. If the test of step 1118 passes, control is passed to step 1120. If the test of step 1118 fails, then CHECK LICENSE returns a FAIL message at block 1124.

At step 1120, the CHECK LICENSE function checks whether the LicenseAgreementString specifies any additional license terms. If there are no other terms, CHECK LICENSE returns a PASS message at block 1126. If there are other terms, CHECK LICENSE determines whether those terms are met at block 1122. If any of the other terms are not met, CHECK LICENSE returns a FAIL message at block 1124. If all of the additional terms are met, CHECK LICENSE returns a PASS message at block 1126.

Figure 12:
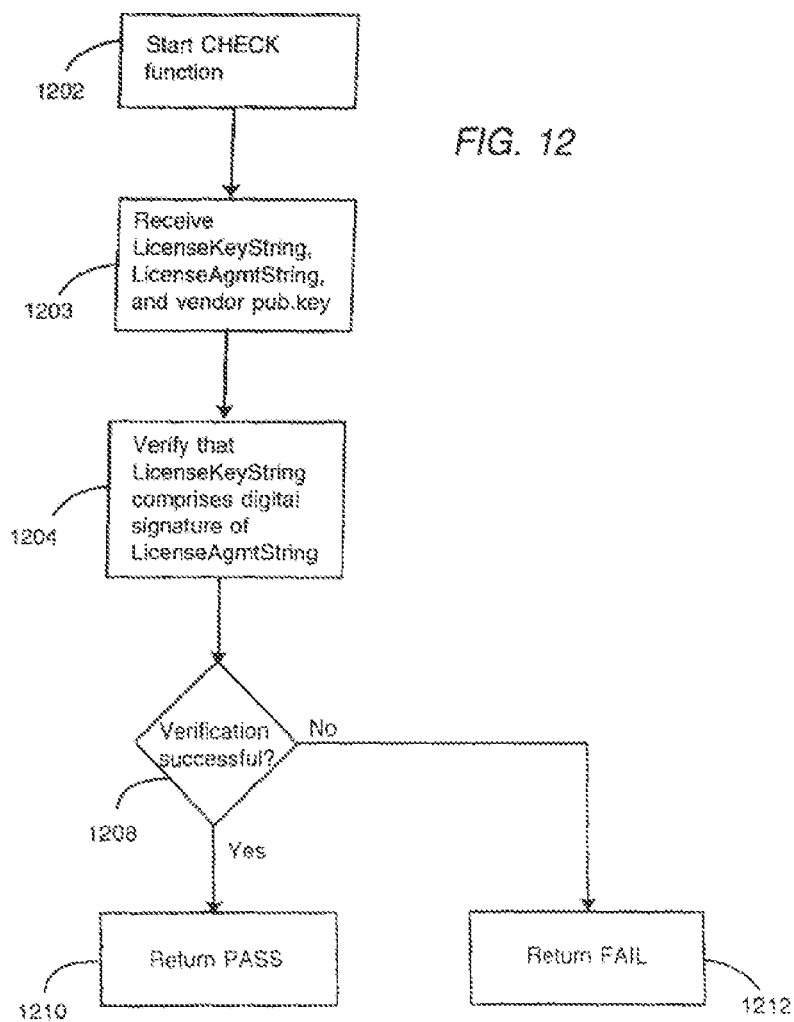
FIG. 12 is a flow start illustrating the operation of one embodiment of the present invention.

The operation of the CHECK function called by CHECK LICENSE at block 1108 is illustrated in FIG. 12. As shown in FIG. 12, the purpose of the CHECK function is to verify the authenticity of a license agreement string by verifying that a corresponding license key string constitutes a valid digital signature of the license agreement string. The CHECK function begins at step 1202 and receives as input a LicenseKeyString, a LicenseAgreementString, and a vendor's public key in step 1203. The public key is generated by the resource library vendor using any known public/private key pair generation process, as is well known in the field of cryptography. For example, key generation using Fast Elliptical Encryption (FEE) can be done, or Diffie-Hellman key generation can be used.

In step 1204 the CHECK function verifies that the LicenseKeyString comprises the digital signature of the LicenseAgreementString. In step 1208, the CHECK function tests whether the verification of step 1204 successfully verified the LicenseKeyString as comprising the digital signature of the LicenseAgreementString. If so, the LicenseAgreementString is valid, and CHECK returns a Boolean true or pass value. If not, the LicenseAgreementString is invalid, and CHECK returns false or failure.

Since the LicenseKeyString of the present embodiment comprises the digital signature of the LicenseAgreementString, the LicenseAgreementString cannot be changed in any way without the change being detected. Stated more generally, because the identifier (e.g. the LicenseKeyString) of the invention is a unique key mathematically derived from a particular text string that specifies license terms for a particular end user program (e.g. the LicenseAgreementString), the identifier can be used to detect any changes to the license terms. This prevents unauthorized modification of the text string from extending use of a resource library to an unlicensed program. For example, if an end user attempts to modify the expiration date using a debugger or machine language editor, the identifier will no longer match the license text string. Without knowing the private key of the vendor, the end user cannot generate a matching identifier.

When a 127-bit private key's is used by the vendor to create the identifier used in the present invention, a determined hacker attempting to forge the private key would need to exhaustively search the 127-bit space, requiring extensive computing resources and an impractical amount of time. Thus, the protection provided by the present invention cannot easily be cracked and the security of the invention as a whole is extremely high.

In addition to allowing per program resource library licensing, if the API vendor or licensor desires to grant a site license for the API to the end user, so that the API is licensed for use with any number of application programs, the API may be provided with a LicenseKeyString and a LicenseAgreementString providing for such unrestricted use. In this embodiment, the API vendor provides a site license key string to the end user as authorization to use the API with any number of applications and other end user programs at that site. The site license key string comprises a digital signature of a site license agreement string created by the API vendor. The site license agreement string may be pre-embedded in the API by the vendor. During installation of the API, an installation program provided with the API asks the end user whether a site license key is known. If so, the end user enters the site license key, and the installation program writes the site license key to a reserved location in the API. Thereafter, when the API initializes, the API tests for the presence of the site license key. If it is present, and it comprises a valid digital signature for the site license text string stored elsewhere in the API, the API is permitted to be used with any application program which is calling it.

OpenStep API

Figure 8:
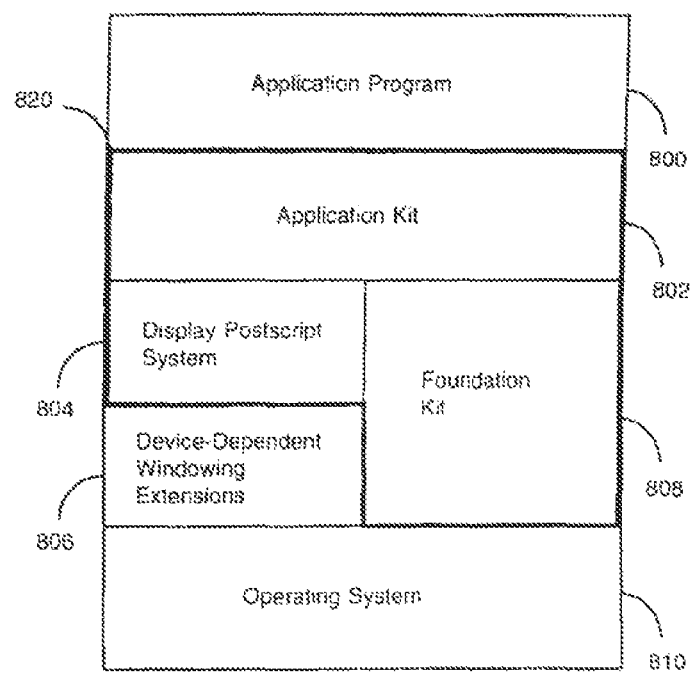
FIG. 8 illustrates a software structure of one embodiment of the present invention.

In one embodiment of the invention, the API used is the object-oriented OpenStep API 820 shown in FIG. 8. A specification of the OpenStep API has been published by NeXT Software. Inc. under the title "OPENSTEP SPECIFICATION," dated Oct. 18, 1994. Implementations of the OpenStep API include implementations for the Windows NT and Solaris operating systems that are available from NeXT Software. Inc. and SunSoft, Inc., respectively.

As shown in FIG. 8, the OpenStep API 820 comprises computer program code organized as an Application Kit 802, Foundation Kit 808, and Display-Postscript system 804. (Display Postscript™ is a trademark of Adobe Systems Incorporated.)

Application Kit 802 provides basic resources for interactive application programs that use windows, draw on the screen, and respond to user actions on the keyboard and mouse. Application Kit 802 contains components that define the user interface. These components include classes, protocols, C language functions, constants and data types that are designed to be used by virtually every application running under the OpenStep API. A principal purpose of Application Kit 802 is to provide a framework for implementing a graphical, event-driven application.

Foundation Kit 808 provides fundamental software functions or building blocks that application programs use to manage data and resources. Foundation Kit 808 defines basic utility classes and facilities for handling multi-byte character sets, object persistency and distribution, and provides an interface to common operating system facilities. Foundation Kit 808 thus provides a level of operating system independence, enhancing the developer's ability to port an application program from one operating system to another.

Display Postscript system 804 provides a device-independent imaging model for displaying documents on a computer screen. Display Postscript is defined by Adobe Systems Incorporated. Display Postscript system 804 provides an application-independent interface to Postscript.

Separate from the API 820, but also logically located between the application program 800 and the operating system 810, is a set of device dependent windowing extensions 806. Extensions 806 enable Display Postscript system 804 to communicate with specific graphics and display hardware in the end user's computer system, such as the video memory or other video display hardware.

Figure 13:
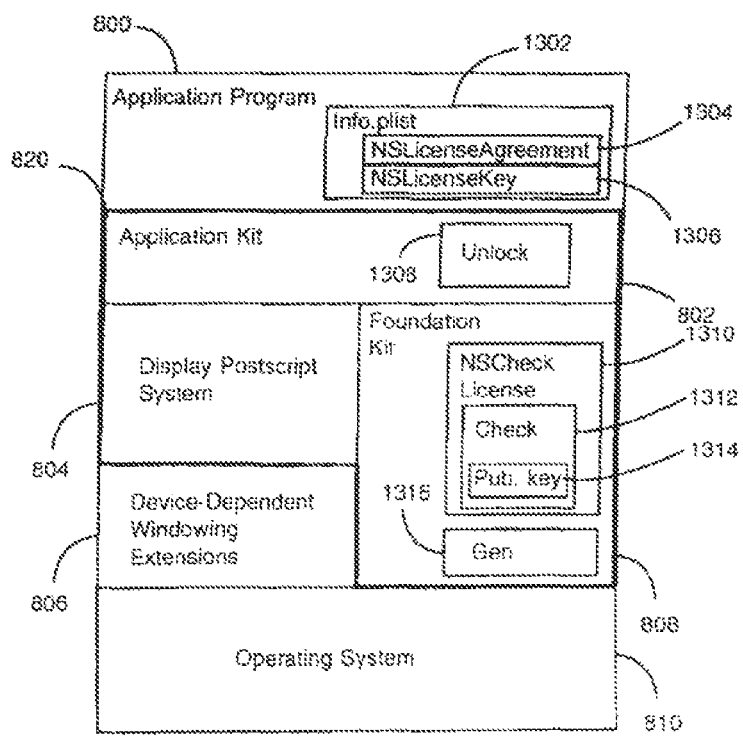
FIG. 13 illustrates a software structure of an embodiment of the present invention using the OpenStep API.

FIG. 13 illustrates an embodiment of the invention used with the OpenStep API of FIG. 8. As shown in FIG. 13, in this embodiment, the license text string and the license key string of the invention are implemented in a property list area 1302 (Info.plist) of the application program code 800. Two string properties are added to the property list area 1302: NSLicenseAgreement 1304, that stores the software license terms applicable to application program 800, and NSLicenseKey 1306, that stores the license key corresponding to NSLicenseAgreement 1304. In this embodiment, as in the embodiment of FIG. 9, NSLicenseKey 1306 is derived from the NSLicenseAgreement string 1304 generated from the license agreement string using a digital signature process and a vendor's private key.

Example values of the two strings placed in the Info.plist are shown in Table 2.

TABLE 2

Info.plist Strings

NSLicenseKey = "Ab76LY2GbbO0GqK2KY17BqHy35";
NSLicenseAgreement = "(c) Copyright 1996, EOF AddOnTools Inc., ReportWriter licensing agreement: This is demonstration software valid until November 2, 1996. This software cannot be legally copied.";

In the OpenStep embodiment of FIG. 13, the UNLOCK function 1308 is implemented as part of Application Kit 802. In one embodiment, UNLOCK function 1308 is implemented by adding appropriate code to a non-redefinable private Application Kit function (such as, for example, NXAppZone( ) in NSApplication.m). An example of source code that may be added is shown in Table 3.

TABLE 3

UNLOCK Code added in OpenStep API Implementation

```
static BOOL licenseChecked = NO;
if (! licenseChecked)
{
NSDictionary *info;
NSString *key, *agreement;
/* First check the unlimited (per-site) license
*/ info = [NSDictionary
dietionaryWithContentsOfFile:@"/OpenStep/AppKit.dll/Inf
o.plist"]; // real path TBD
    key = [info objectForKey:@"NSLicenseKey"];
    agreement = [info
objectForKey:@"NSLicenseAgreement
"];
  if (INSCheckLicense(key, agreement))
    {
    /* now check for the per-app license */
    info = [[NSBundle mainBundle]
infoDictionary];
    key = [info objectForKey:@"NSLicenseKey"];
    agreement = [info
objectForKey: ©"NSLicenseAgreement"];
    if (INSCheckLicense(key, agreement))
      {
      NSLog(@"*** Sorry no valid license for %@", [NSApp
appName]);
      }
    }
  licenseChecked = YES;
}
```

The NSCheckLicense( ) function, which is called twice in the code segment of Table 3, as shown in FIG. 13, is implemented in the Foundation Kit portion 808 of the OpenStep API 820. The NSCheckLicense function 1310 corresponds to the CHECK LICENSE function 921 illustrated in FIG. 9. The NSCheckLicense function 1310 verifies NSLicenseAgreement string 1304 using NSLicenseKey string 1306 and a digital signature authentication process. The NSCheckLicense function 1310 has the following definition:

extern BOOL NSCheekLicense (NSString *licenseKey, NSString * licenseAgreement);

The NSCheckLicense function 1310, like the Check License function 921 of FIG. 9, applies a CHECK function 1312 to NSLicenseAgreement string 1304 and NSLicenseKey 1306, using the API vendor's public key, to determine the validity of NSLicenseAgreement string 1304. In the embodiment of FIG. 13, CHECK function 1312 includes in its code a copy of the API vendor's public key 1314.

In the embodiment of FIG. 13, API 820 includes a "GEN" process 1316 that can be used by an API vendor to rapidly generate license key strings for use by CHECK function 1312. GEN process 1316 receives as input a license agreement string and a secret private key, and produces as output a licensing key string, using a digital signature generating process. The private key may, for example, be a 127-bit private key, although any other size private key may be used. The signature generating process used by GEN process 1316 is compatible with the digital signature authentication process used by CHECK function 1312. GEN process 1316 itself can be made entirely public and implemented in the API provided that the private key of the API vendor is maintained in secrecy. For example, the GEN process can be part of the OpenStep API Foundation Kit 808 as shown in FIG. 13. GEN also can be maintained in a separate program module.

The logical relationship between GEN and CHECK is:

```
CHECK(GEN(LicenseAgreementString, PrivateKey), Public Key,
LicenseAgreementString) => YES
CHECK(random1, random2) => NO with a very high probability
```

In one embodiment of the invention, a shell is provided for the GEN process. The shell can receive as input a license agreement template string, such as:

```
(c) Copyright 1995, %@, %@ licensing agreement; Demo software valid
until %@; This agreement cannot be legally copied
``` where %@ represents additional data to be provided by the API vendor. The shell then asks the user (i.e. the API vendor) to input the additional data, for example a company name, a product name, an expiration date, from which the shell generates a specific license agreement string. The shell then asks for the private key and applies GEN to create a corresponding license key.

The same shell can be used for per-program license keys or per-site license keys, using different templates.

In one embodiment of the invention, an installer program is provided for installing a resource library on an end user computer. The installer program is provided with a feature enabling the end user to provide a site license key during installation. For example, if the resource library is the OpenStep API, additional code is added to the OpenStep API installer program. The user is asked during the installation of the resource library if the user has obtained a per-site license. If the user replies yes, the user is asked to enter the site license key string. In one embodiment, the user is also asked to enter the site license agreement string. In another embodiment, the site license agreement string is stored in the resource library, such as, for example, in the OpenStep API DLL Application Kit's Info.plist resource file. The site license key and site license agreement are validated by the CHECK LICENSE function as described above. Use of the resource library is permitted only if the site license key string input by the user corresponds to (i.e. is found to comprise the resource library vendor's digital signature of) the site license agreement string.

Java

The present invention may be used with resource libraries such as Java class files, Java applets, and Java bytecode packages. FIG. 14 illustrates an embodiment of the invention in which the resource library is a Java applet. In the embodiment shown in FIG. 14, an applet is called from an HTML page 1402 via applet tag 1404. Applet tag 1404 includes the name of the applet's class file and applet parameters 1406. Applet parameters 1406 include a license agreement string parameter 1408 and a license key string parameter 1410. License agreement string parameter 1408 specifies a license agreement string that contains terms of a license to use the called for applet. License key string parameter 1410 specifies a license key used to authenticate the license agreement string. As in other embodiments of the invention, in this embodiment, the license key string comprises a digital signature by the resource library (applet) vendor of the license agreement string. Table 4 illustrates an example of applet tag 1404.

TABLE 4

```
<APPLET CODE="Applet.class" WIDTH=250 HEIGKT=75>
<PARAM NAME=LicenseAgreementString VALUE="Web page
orderform.html licensed to use applet 'Applet.class ' >
<PARAM NAME=LicenseKeyString VALUE="4kd094kak2rtx0kzq">
</APPLET>
```

In the example of Table 4, the license agreement string specifies the name of the HTML page ("orderform.html") and the name of the licensed applet ("applet.class"). As shown in FIG. 14, applet 1434 is accessed when HTML page 1402 is loaded by a HTML browser 1430 running in a client computer 1420. In the embodiment of FIG. 14, HTML browser 1430 runs on top of an API 1424 which in turn runs on top of operating system 1422. HTML browser 1430 includes a Java virtual machine 1432 for running Java applets.

Upon encountering applet tag 1404 while loading HTML page 1402, HTML browser 1430 retrieves the class files that constitute applet 1434 from storage locations on client computer 1420 and/or from one or more server computers, as applicable. One of the class files includes CheckLicense class file 1436. After HTML browser 1430 has retrieved all the required components of applet 1434, applet 1434 is initialized. During initialization, or at a later time, the CheckLicense function provided by CheckLicense class file 1436 is called. As in other embodiments of the invention, the CheckLicense function determines whether the requesting entity (HTML page 1402) possesses a valid license to use the requested resource (applet 1434) by testing the authenticity of the license specified by LicenseAgreementString parameter 1408 using the license key specified by LicenseKeyString parameter 1410 and the applet vendor's public key 1438. If the CheckLicense function determines that HTML page 1402 possesses a valid license, applet 1434 is allowed to execute. If not, execution of applet 1434 is terminated, and an error message is sent to HTML browser 1430.

Thus, an improved method and apparatus for enforcing software licenses has been presented. Although the present invention has been described with respect to certain example embodiments, it will be apparent to those skilled in the art that the present invention is not limited to these specific embodiments. For example, although the invention has been described for use in stand-alone computer systems, the invention can be used to enforce licenses in a network environment as well. Further, although the operation of certain embodiments has been described in detail using specific software programs and certain detailed process steps, different software may be used, and some of the steps may be omitted or other similar steps may be substituted, without departing from the scope of the invention. Other embodiments incorporating the inventive features of the present invention will be apparent to those skilled in the art.

What is claimed is:

1. A method for controlling a manner in which a software application accesses an application programming interface (API), wherein the software application executes on a computing device and the API is available on the computing device, and the method comprises:
receiving, from the software application executing on the computing device, a request to access the API;
extracting, from the API, first license information that identifies whether all software applications executing on the computing device are permitted to access the API;
identifying, based on the first license information, that not all software applications executing on the computing device are permitted to access the API; and
in response to identifying:
extracting, from the software application, second license information that identifies whether the software application is permitted to access the API,
determining, based on the second license information, that the software application is permitted to access the API, and
in response to determining:
granting the software application access to the API.

2. The method of claim 1, wherein the API comprises a toolkit, a framework, a runtime library, a dynamic link library, or an applet, and the request to access the API is generated by a calling function or an object associated with the software application.

3. The method of claim 1, wherein determining that the software application is permitted to access the API comprises utilizing a function, a key, and a text string associated with the software application.

4. The method of claim 3, wherein the text string includes one or more use terms, and the key is unique to the software application and the use terms.

5. The method of claim 1, wherein the first license information comprises a site license for the computing device.

6. A non-transitory computer readable storage medium storing instructions that, when executed by a processor included in a computing device, cause the computing device to control a manner in which a software application accesses an application programming interface (API), by carrying out steps that include:
receiving, from the software application executing on the computing device, a request to access the API;
extracting, from the API, first license information that identifies whether all software applications executing on the computing device are permitted to access the API;
identifying, based on the first license information, that not all software applications executing on the computing device are permitted to access the API; and
in response to identifying:
extracting, from the software application, second license information that identifies whether the software application is permitted to access the API,
determining, based on the second license information, that the software application is permitted to access the API, and
in response to determining:
granting the software application access to the API.

7. The non-transitory computer readable storage medium of claim 6, wherein the API comprises a toolkit, a framework, a runtime library, a dynamic link library, or an applet, and the request to access the API is generated by a calling function or an object associated with the software application.

8. The non-transitory computer readable storage medium of claim 6, wherein determining that the software application is permitted to access the API comprises utilizing a function, a key, and a text string associated with the software application.

9. The non-transitory computer readable storage medium of claim 8, wherein the text string includes one or more use terms, and the key is unique to the software application and the use terms.

10. The non-transitory computer readable storage medium of claim 6, wherein the first license information comprises a site license for the computing device.

11. A system, comprising:
at least one processor; and
a storage device storing instructions that, when executed by the at least one processor, cause the at least one processor to control a manner in which a software application accesses an application programming interface (API), by carrying out steps that include:
receiving, from the software application executing on the system, a request to access the API;
extracting, from the API, first license information that identifies whether all software applications executing on the system are permitted to access the API;
identifying, based on the first license information, that not all software applications executing on the system are permitted to access the API; and
in response to identifying:
extracting, from the software application, second license information that identifies whether the software application is permitted to access the API,
determining, based on the second license information, that the software application is permitted to access the API, and
in response to determining:
granting the software application access to the API.

12. The system of claim 11, wherein the API comprises a toolkit, a framework, a runtime library, a dynamic link library, or an applet, and the request to access the API is generated by a calling function or an object associated with the software application.

13. The system of claim 11, wherein determining that the software application is permitted to access the API comprises utilizing a function, a key, and a text string associated with the software application.

14. The system of claim 13, wherein the text string includes one or more use terms, and the key is unique to the software application and the use terms.

15. The system of claim 11, wherein the first license information comprises a site license for the system.

16. The method of claim 1, wherein extracting the second license information from the software application comprises reading from a data segment of the software application a license key string and a license agreement string.

17. The method of claim 1, wherein extracting the second license information from the software application comprises receiving a transmission of the second license information from the software application.

18. The non-transitory computer readable storage medium of claim 6, wherein extracting the second license information from the software application comprises reading from a data segment of the software application a license key string and a license agreement string.

19. The non-transitory computer readable storage medium of claim 6, wherein extracting the second license information from the software application comprises receiving a transmission of the second license information from the software application.

20. The system of claim 11, wherein extracting the second license information from the software application comprises reading from a data segment of the software application a license key string and a license agreement string.

* * * * *